US012731064B2

(12) United States Patent
Chong et al.

(10) Patent No.: US 12,731,064 B2
(45) Date of Patent: Sep. 8, 2026

(54) SYSTEMS AND METHODS FOR OPTIMIZED PULSES FOR CONTINUOUS QUANTUM GATE FAMILIES THROUGH PARAMETER SPACE INTERPOLATION

(71) Applicant: University of Chicago, Chicago, IL (US)

(72) Inventors: Frederic T. Chong, Chicago, IL (US); Jason Chadwick, Chicago, IL (US)

( * ) Notice: Subject to any disclaimer, the term of this patent is extended or adjusted under 35 U.S.C. 154(b) by 839 days.

(21) Appl. No.: 18/188,731

(22) Filed: Mar. 23, 2023

(65) Prior Publication Data

US 2024/0211791 A1 Jun. 27, 2024

Related U.S. Application Data

(60) Provisional application No. 63/476,844, filed on Dec. 22, 2022.

(51) Int. Cl.
*G06N 10/60* (2022.01)
*G06F 9/30* (2018.01)
*G06N 10/40* (2022.01)

(52) U.S. Cl.
CPC ......... *G06N 10/60* (2022.01); *G06F 9/30036* (2013.01); *G06N 10/40* (2022.01)

(58) Field of Classification Search
None
See application file for complete search history.

(56) References Cited

U.S. PATENT DOCUMENTS

2012/0045136 A1 2/2012 Rose
2019/0220771 A1 7/2019 Boothby et al.
2019/0392341 A1 12/2019 Leipold et al.
(Continued)

FOREIGN PATENT DOCUMENTS

WO WO-2021050541 A1 * 3/2021 ............ G06N 10/40

OTHER PUBLICATIONS

Preti et al. "Continuous Quantum Gate Sets and Pulse-Class Meta-Optimization." PRX Quantum 3.4 (2022): Oct. 25, 2022 (Oct. 25, 2022) 040311. Retrieved on Jun. 6, 2025 (Jun. 6, 2025) from <https://journals.aps.org/prxquantum/pdf/10.1103/PRXQuantum.3.040311> entire document.

(Continued)

*Primary Examiner* — Jeremy L Stanley
*Assistant Examiner* — Asher H. Jablon
(74) *Attorney, Agent, or Firm* — Armstrong Teasdale LLP

(57) ABSTRACT

A quantum computing system for optimizing instructions of a quantum circuit is configured to: select reference points in a parameter space of a family of gates that are executable by the quantum processor; identify edges in the parameter space connecting two reference points; compute a pulse vector for each reference point of the plurality of reference points; optimize the pulse vector for each reference point of the plurality of reference points based on the first pulse vector of each neighboring reference point connected to that reference point by an edge; receive a target operation from the quantum circuit for optimization; compute a second pulse vector for the target operation based on interpolating between a subset of reference points of the plurality of reference points; and executed the target operation on a quantum processor using the pulse vector for the target operation.

20 Claims, 5 Drawing Sheets

(56) References Cited

U.S. PATENT DOCUMENTS

| | | | |
|---|---|---|---|
| 2020/0285985 | A1 | 9/2020 | Javadiabhari |
| 2020/0342344 | A1 | 10/2020 | Gambetta et al. |
| 2020/0349459 | A1 | 11/2020 | Cao et al. |
| 2022/0164506 | A1 | 5/2022 | Pednault et al. |
| 2022/0374390 | A1 | 11/2022 | Chong et al. |
| 2024/0211791 | A1 | 6/2024 | Chong et al. |

OTHER PUBLICATIONS

ISR and Written Opinion for International Application No. PCT/US2023/078802, 12 pages, Jun. 18, 2025.

Sorenson, Anders, et al., “Entanglement and quantum computation with ions in thermal motion”, Institute of Physics and Astronomy, University of Aarhus, 2000; 11 pps.

Sorenson, Anders, et al., “Quantum computation with ions in thermal motion”, Institute of Physics and Astronomy, University of Aarhus, 1999; 5 pps.

Molmer, Klaus, et al., “Multi-particle entanglement of hot trapped ions”, Institute of Physics and Astronomy, University of Aarhus, 1999; 4 pps.

Virtanen, Pauli, et al., “SciPly 1.0—Fundamental Algorithms for Scientific Computing in Python”, SciPly, 2019; 22 pps.

Petersson, N. Anders, et al., “Optimal control of closed quantum systems via b-splines with carrier waves.” 2022; 25 pps.

Ball, Harrison, et al., “Software tools for quantum control: improving quantum computer performance through noise and error suppression.” 2020; 56 pps.

Crooks, Gavin, “Gates, States, and Circuits”, 2022; 79 pps.

Goldschmidt, Andy, et al., “Model predictive control for robust quantum state preparation”, 2022; 25 pps.

Wu, Re-Bing, et al., “A data-driven gradient algorithm for high-precision quantum control”, 2018; 17 pps.

Valahu, C. H., et al., “Quantum control methods for robust entanglement of trapped ions”, 2022; 29 pps.

Leung, Pak Hong, et al., “Robust two-qubit gates in a linear ion crystal using a frequency-modulated driving force”, 2017, 8 pps.

Tannu, Swamit S., et al., “Not all qubits are created equal: a case for variability-aware policies for NISQ-Era quantum computers”, 2018; 12 pps.

Murali, Prakash, et al., “Noise-adaptive compiler mappings for noisy intermediate-scale quantum computers”, 2019; 14 pps.

Li Jr-Shin, et al., “Optimal pulse design in quantum control: a unified computational method”, 2011; 6 pps.

Sauvage, Frederic, et al., “Optimal control of families of quantum gates”, 2021; 9 pps.

Shi, Yuan, et al., “Simulating nonnative cubic interactions on noisy quantum machines”, 2020; 8 pps.

Luchi, Piero, et al., “Control optimization for parametric hamiltonians by pulse reconstruction”, 2021; 13 pps.

Earnest, Nathan, et al., “Pulse-efficient circuit transpilation for quantum applications on cross-resonance-based hardware”, 2021; 12 pps.

Gokhale, Pranav, et al., “Optimized quantum compilation for near-term algorithms with openpulse”, 2020; 15 pps.

Q-CTRL, ‘Boulder Opal,’ 2022. https://q-ctrl.com/boulder-opal.

* cited by examiner

SYSTEMS AND METHODS FOR OPTIMIZED PULSES FOR CONTINUOUS QUANTUM GATE FAMILIES THROUGH PARAMETER SPACE INTERPOLATION

CROSS-REFERENCE TO RELATED APPLICATION

This application claims priority to and the benefit of U.S. Provisional Patent Application Ser. No. 63/476,844, entitled SYSTEMS AND METHODS FOR OPTIMIZED PULSES FOR CONTINUOUS QUANTUM GATE FAMILIES THROUGH PARAMETER SPACE INTERPOLATION, filed Dec. 22, 2022, the contents of which are incorporated herein in its entirety.

STATEMENT REGARDING FEDERALLY SPONSORED RESEARCH & DEVELOPMENT

This invention was made with government support under grant number DE-SC00203331 awarded by the Department of Energy and grant number 1730449 awarded by The National Science Foundation. The government has certain rights in the invention.

TECHNICAL FIELD

This disclosure relates generally to quantum computing and, more specifically, to systems and methods for optimizing quantum control pulses for continuous gate families.

BACKGROUND

Recent developments in quantum computing have pushed quantum computers closer to solving classically intractable problems. Quantum circuits consist of logical operations to be performed on qubits of a quantum computer during execution of a quantum program. These quantum circuits are typically decomposed into a set of elementary basis operations that are specific to a given type of quantum hardware device. These basis operations may be specifically calibrated to achieve high accuracy. However, the space of all quantum operations that may be desired to be performed by any particular quantum circuit is much larger than just the hardware basis set. The ability to perform any arbitrary operations with high fidelity could vastly improve the capabilities of quantum computers.

What is needed is a system and method for optimizing arbitrary quantum operations requested by a given quantum circuit while avoiding the classical computational burdens of optimizing every arbitrary quantum operation of that quantum circuit.

BRIEF DESCRIPTION

In one aspect, a quantum computing system for compiling and executing instructions on a quantum computer is provided. In an example, the quantum processor includes a plurality of qubits and a classical memory including a quantum circuit. The quantum circuit defines a plurality of instructions for execution. A classical processor is communicatively coupled to the classical memory and the memory includes computer-executable instructions that, when executed by the classical processor, cause the classical processor to identify a plurality of reference points in a parameter space of a family of gates that are executable by the quantum processor and identify a plurality of edges in the parameter space. In an example, each edge connects two reference points of the plurality of reference points and define a neighbor relationship between the two connected reference points. An initial pulse vector is generated for each reference point of the plurality of reference points. The initial pulse vector is optimized for each reference point of the plurality of reference points based on the initial pulse vector of each neighboring reference point connected to that reference point by an edge. A target operation is identified within the quantum circuit for optimization and a pulse vector is generated for the target operation based on interpolating between a subset of reference points of the plurality of reference points. The target operation is executed on the quantum processor using the pulse vector for the target operation.

In another embodiment, a computer-implemented method for compiling instructions for a quantum computer is provided. The method is implemented using a classical processor in communication with a classical memory. In an example, the method includes selecting a plurality of reference points in a parameter space of a family of gates that are executable by the quantum processor and identifying a plurality of edges in the parameter space. In an example, each edge connects two reference points of the plurality of reference points and define a neighbor relationship between the two connected reference points. The method also includes computing a first pulse vector for each reference point of the plurality of reference points and optimizing the first pulse vector for each reference point of the plurality of reference points based on the first pulse vector of each neighboring reference point connected to that reference point by an edge. The method also includes receiving a target operation from the quantum circuit for optimization, computing a second pulse vector for the target operation based on interpolating between a subset of reference points of the plurality of reference points and causing the target operation to be executed on a quantum processor using the pulse vector for the target operation.

In yet another embodiment, a non-transitory computer-readable storage media having computer-executable instructions embodied thereon. When executed by at least one classical processor, the computer-executable instructions cause the classical processor to select a plurality of reference points in a parameter space of a family of gates that are executable by the quantum processor and identify a plurality of edges in the parameter space, each edge connecting two reference points of the plurality of reference points and defining a neighbor relationship between the two connected reference points. The processor also computes a first pulse vector for each reference point of the plurality of reference points and optimizes the first pulse vector for each reference point of the plurality of reference points based on the first pulse vector of each neighboring reference point connected to that reference point by an edge. The processor also identifies a target operation from the quantum circuit for optimization, computes a second pulse vector for the target operation based on interpolating between a subset of reference points of the plurality of reference points and transmits the target operation to a quantum processor for execution, using the pulse vector for the target operation.

BRIEF DESCRIPTION OF THE DRAWINGS

FIGS. 1-4 show exemplary embodiments of the methods and systems described herein.

FIG. 1 is a diagram of exemplary quantum computing system for optimizing instructions for execution on a quantum computing device.

FIG. 3 is a flow chart illustrating an example method for optimizing reference pulses and interpolating arbitrary operations within a parameter space for operations of the quantum circuit shown in FIG. 1 using the graph of a parameter space shown in FIG. 2A FIG. 4 is a flow chart illustrating an example method for optimizing arbitrary operations within the parameter space using the graph shown in FIG. 2A.

DETAILED DESCRIPTION OF THE DISCLOSURE

Figure 1:
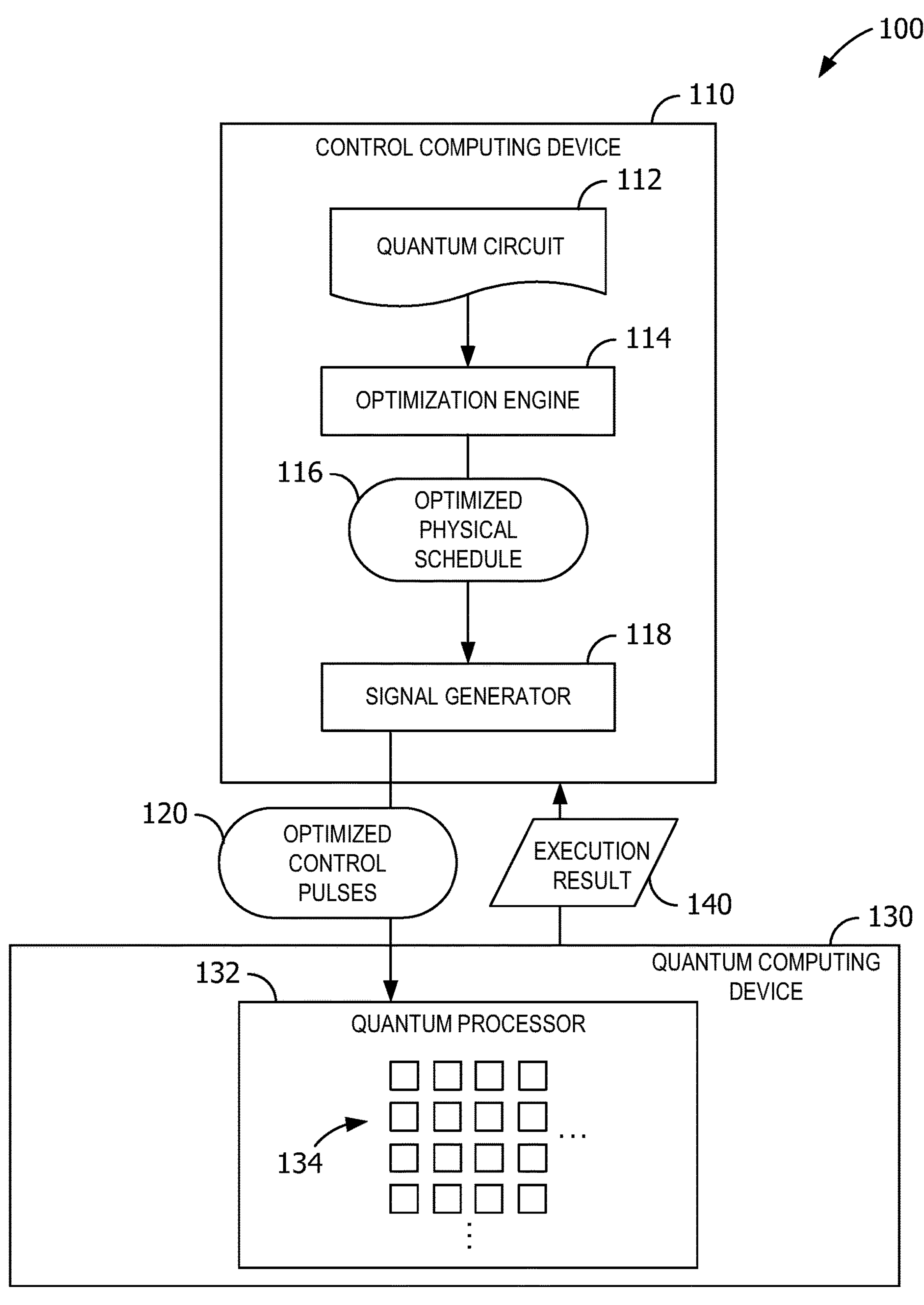

The following detailed description illustrates embodiments of the disclosure by way of example and not by way of limitation. It is contemplated that the disclosure has general application to quantum computing.

Known quantum optimal control methods provide ways to improve the fidelity of specific quantum operations on a given device by, for example, shaping control pulses to execute a target operation with high fidelity. Typically, the same operation can be achieved with many distinct pulse sequences. However, given this observation, it is unlikely that two arbitrary control pulses for different operations could simply be interpolated between to execute an intermediate operation. Such arbitrary gates exist in a parameter space somewhere between each of the basis operations, and it can be computationally expensive, in a classical computing sense, to optimize every gate that may be executed by a given quantum circuit.

A quantum computing system and associated methods are described herein for addressing these and related problems. The quantum computing system described herein includes an optimization engine (e.g., executed on a classical computing device) that is configured to optimize a quantum circuit for execution on a quantum processor. More specifically, the quantum computing system includes an optimization engine that that is configured to perform a two-stage optimization process for preparing a quantum circuit for execution. In a first stage, the optimization engine prepares an optimization graph of reference points and edges in a parameter space of a gate family that is supported by a particular quantum computing device. The optimization engine generates an initial set of control pulses for each reference point, but then reoptimizes those reference points using a novel neighbor-averaging method to prepare the reference points for improved support of interpolation between those reference points. In a second stage, the optimization engine uses the graph to generate control pulses for arbitrary operations within the parameter space. More specifically, in example embodiments, the optimization engine uses barycentric coordinate interpolation between the particular operation and several nearby reference points in the parameter space to generate an optimized control pulse vector for that particular operation. As such, the quantum computing system is able to generate control pulses for operations that have improvements in infidelity during execution.

The term "classical," as used herein, refers to conventional transistor-based computing technology. This term, where necessary, is used to distinguish conventional computing devices or associated hardware, software, algorithms, and such, from "quantum" computing. Quantum computing devices or associated hardware, software, algorithms, and such, are typically distinguished from classical computing devices based on their reliance on quantum phenomena of quantum mechanics to perform processing operations. Example classical computing devices include conventional personal computers, servers, tablets, smartphones, x86-based processors, random access memory ("RAM") modules, and so forth. Example quantum computing devices include "IBM Q" devices from International Business Machines (IBM), "Bristlecone" quantum computing device from Google, "Tangle Lake" quantum computing device from Intel, and "2000Q" from D-Wave. The term "classical bit" or "cbit" may be used herein to refer to a bit within classical computing. The term "qubit" may be used herein to refer to a quantum bit in quantum computing.

FIG. 1 is a diagram of exemplary quantum computing system 100 for optimizing instructions for execution on a quantum computing device 130. The quantum computing system 100 includes a control computing device 110 that is configured to prepare (e.g., compile and optimize) a quantum circuit 112 for execution on the quantum computing device 130. The control computing device 110 is a classical computing device (e.g., including one or more classical processors, classical bits of memory, and other such hardware components consistent with conventional classical computers). The quantum computing device 130 includes multiple qubits 134 that represent a quantum processor 132 upon which the quantum circuit 112 is executed. In the example embodiment, the quantum processor 132 includes 50 or 100 qubits, but it should be understood that the present disclosure is envisioned to be operable and beneficial for quantum processors with many tens, hundreds, or more qubits 134.

The qubit 134 is the basic element of a quantum computing device such as the quantum computing device 130 shown in FIG. 1. In contrast to classical bits ("cbits"), qubits are capable of existing in a superposition of logical states, notated herein as $|0\rangle$ and $|1\rangle$. The general quantum state of a qubit may be represented as:

$$|\psi 1\rangle = \alpha|0\rangle + \beta|1\rangle,$$

where α, β are complex coefficients with $|\alpha|^2+|\beta|^2=1$. When measured in the 0/1 basis, the quantum state collapses to $|0\rangle$ or $|1\rangle$ with a probability of $|\alpha|^2$ and $|\beta|^2$, respectively. The qubit 134 can be visualized as a point on a 3D sphere called the Bloch sphere. Qubits 134 can be realized on different Quantum Information Processing (QIP) platforms, including ion traps, quantum dot systems, and, in the example embodiment, superconducting circuits. The number of quantum logical states grows exponentially with the number of qubits 134 in the quantum processor 132. For example, a system with three qubits 134 can live in the superposition of eight logical states: $|000\rangle$, $|001\rangle$, $|010\rangle$, $|011\rangle$, . . . , $|111\rangle$. This property sets the foundation of potential quantum speedup over classical computation. In other words, an exponential number of correlated logical states can be stored and processed simultaneously by the quantum system 100 with a linear number of qubits 134.

During quantum compilation, the quantum circuit 112 is first decomposed into a set of 1- and 2-qubit discrete quantum operations called logical quantum gates. In some examples, these quantum gates are represented in matrix form as unitary matrices. 1-qubit gates may correspond to rotations along a particular axis on the Bloch sphere. In an example quantum ISA, the 1-qubit gate set may include rotations along the x-, y-, and z-axes of the Block sphere. Such gates are notated herein as $R_x$, $R_y$, and $R_z$ gates, respectively. Further, the quantum ISA may also include a Hadamard gate, which corresponds to a rotation about the diagonal x+z axis. An example of a 2-qubit logical gate in the quantum ISA is a Controlled-NOT ("CNOT") gate, which flips the state of the target qubit if the control qubit is $|1\rangle$ or leaves the state unchanged if the control qubit is $|0\rangle$. For example, the CNOT gate sends $|10\rangle$ to $|11\rangle$, sends $|11\rangle$ to $|10\rangle$, and preserves the other logical states.

Further, it should be understood that the general logical assembly instructions typically used during compilation of the quantum circuit 112 were designed without direct consideration for the variations in the types of physical hardware that may be used. As such, there is often a mismatch between the logical instructions and the capabilities of the particular QIP platform. For example, on some QIP platforms, it may not be obvious how to implement the CNOT gate directly on that particular physical platform. As such, a CNOT gate may be further decomposed into physical gates in a standard gate-based compilation. Other example physical quantum gates for various architectures include, for example, in platforms with Heisenberg interaction Hamiltonian, such as quantum dots, the directly implementable 2-qubit physical gate is the $\sqrt{\text{SWAP}}$ gate (which implements a SWAP when applied twice). In platforms with ZZ interaction Hamiltonian, such as superconducting systems of Josephson flux qubits and NMR quantum systems, the physical gate is the CPhase gate, which is identical to the CNOT gate up to single qubit rotations. In platforms with XY interaction Hamiltonian, such as capacitively coupled Josephson charge qubits (e.g., transmon qubits), the 2-qubit physical gate is iSWAP gate. For trapped ion platforms with dipole-chain interaction, two popular physical 2-qubit gates are the geometric phase gate and the XX gate.

The quantum processor 132 can be continuously driven by external physical operations to any state in the space spanned by the logical states. The physical operations, called control fields, are specific to the underlying system, with control fields and system characteristics controlling a unique and time-dependent quantity called the Hamiltonian. The Hamiltonian determines the evolution path of the quantum states. For example, in superconducting systems such as the example quantum computing device 130, the qubits 134 can be driven to rotate continuously on the Bloch sphere by applying microwave electrical signals. By varying the intensity of the microwave signal, the speed of rotation of the qubit 134 can be manipulated. The ability to engineer the system Hamiltonian in real time allows the quantum computing system 100 to direct the qubits 134 to the quantum state of interest through precise control of related control fields. Thus, quantum computing may be achieved by constructing a quantum system in which the Hamiltonian evolves in a way that aligns with high probability upon final measurement of the qubits 134. In the context of quantum control, quantum gates can be regarded as a set of pre-programmed control fields performed on the quantum processor 132.

In the example embodiment, the control computing device 110 includes an optimization engine 114 that, during operation, is configured to compile the quantum circuit 112 (e.g., from source code) and/or optimize the quantum circuit 112 into an optimized physical schedule 116. The optimized physical schedule 116 represents a set of control instructions and associated schedule that, when sent to the quantum computing device 130 as optimized control pulses 120 (e.g., the pre-programmed control fields) by a signal generator 118, cause the quantum computing device 130 to execute the quantum circuit 112, thereby generating an execution result 140. In the example embodiment, the quantum computing device 130 is a superconducting device and the signal generator 118 is an arbitrary wave generator ("AWG") configured to perform the optimized control pulses 120 on the quantum processor 132 (e.g., via microwave pulses sent to the qubits 134, where the axis of rotation is determined by the quadrature amplitude modulation of the signal and where the angle of rotation is determined by the pulse length of the signal). It should be understood that other quantum computing architectures may have different supporting hardware.

In other words, the optimization engine 114, in the example embodiment, takes the quantum circuit 112 as input, applying a series of transformations to produce control pulses (e.g., the optimized physical schedule 116) that implement the computation on the quantum computing device 130. Several operational objectives of the optimization engine 114, in the example embodiment, include: (A) creating an interpolation model of the set of gates used by the quantum circuit 112 (e.g., a set of "basis operations") and that can be performed on the particular hardware architecture of the quantum computing device 130; (B) optimizing control pulses for specific "reference points" that are tailored towards interpolation; (C) performing interpolation to obtain control pulses for each operation in the input circuit 112.

Figure 2A:
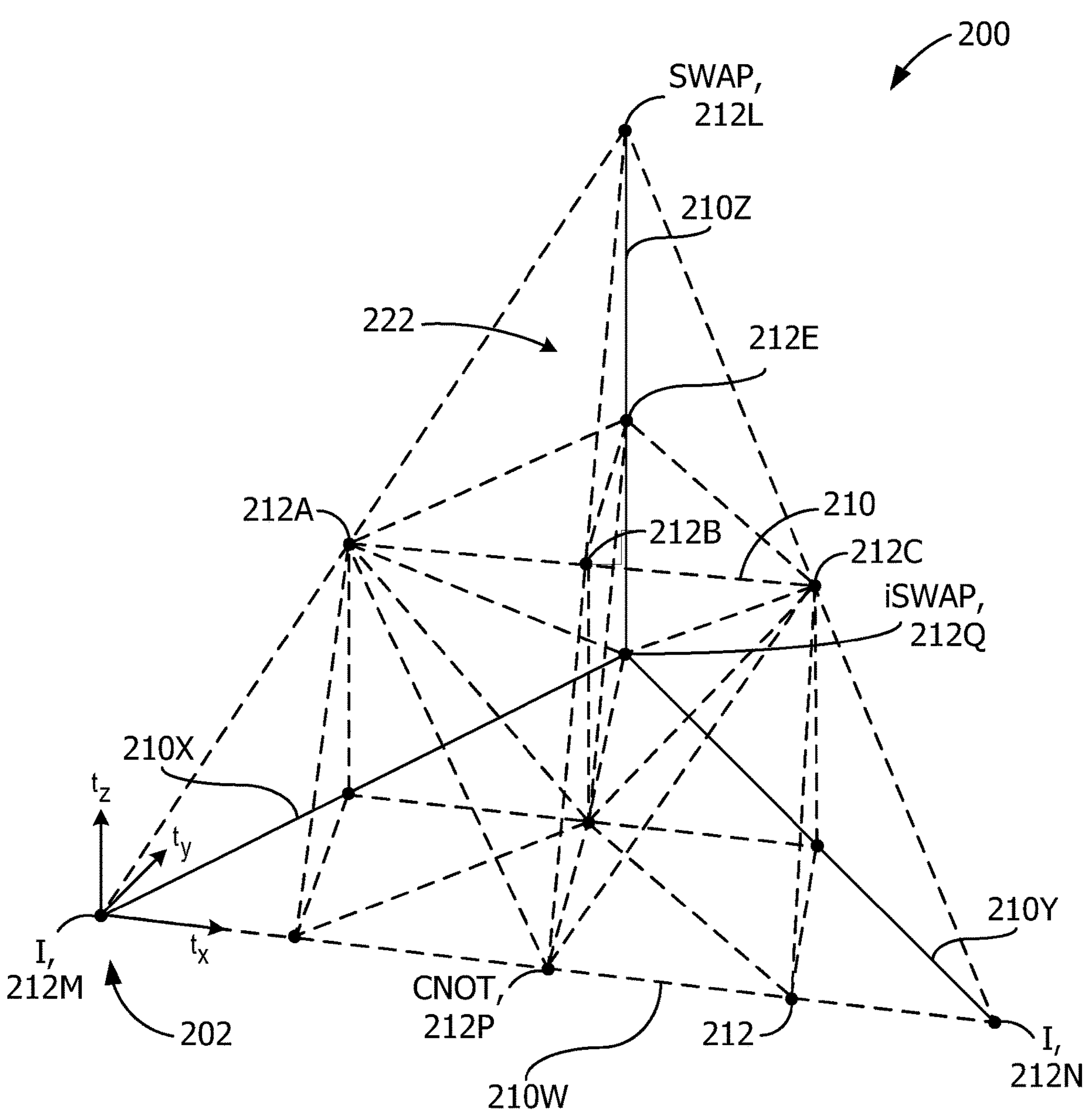
FIG. 2A is a diagram and graph of a Cartan coordinate space that may be created and used by the optimization engine to optimize quantum operations of the quantum circuit of FIG. 1

FIG. 2A is a diagram and graph 200 of a Cartan coordinate space 202 that may be created and used by the optimization engine 114 to optimize quantum operations of the quantum circuit 112 of FIG. 1. In the example embodiment, the coordinate space 202 is in three dimensions, labeled $t_x$, $t_y$, and $t_z$. These three dimensions (e.g., axes) are used to represent three parameters of a parameter space associated with two-qubit gates of a particular gate family used by the quantum circuit 112. As such, the coordinate space 202 may also be referred to herein as a parameter space 202.

In the example shown in FIG. 2A, the graph 200 presents a large tetrahedron in the parameter space 202 bounded by four reference points 212L, 212M, 212N, and 212Q. Each of these "corner" reference points 212L-Q are connected by lines 210W, 210X, 210Y, and 210Z. Together, these reference points 212L-Q and lines 212W-Z bound an interior "volume" within the parameter space 202 that is of interest to the quantum computing system 100 and, particularly, to the optimization engine 114 when optimizing the quantum circuit 112 for execution. More specifically, in the example embodiment, all possible 2-qubit operations that can be used by the quantum circuit 112 on the quantum computing device 130 of FIG. 1 can be represented as some point within this volume of the parameter space 202.

Any two-qubit quantum logic gate $U \in SU(4)$ can be written as:

$$U = k_1 \exp\left(-i\frac{\pi}{2}(t_x X \otimes X + t_y Y \otimes Y + t_z Z \otimes Z)\right)k_2 \quad (1)$$

in terms of Pauli gates X, Y, and Z and Cartan coordinates $t_x$, $t_y$, and $t_z$. The matrices $k_1, k_2 \in SU(2) \otimes SU(2)$ represent single-qubit gates acting on the qubits independently (e.g., $k_1=U_0 \otimes U_1$ for some single-qubit gates $U_0$ and $U_1$. Two distinct gates are referred to as "logically equivalent" or "equivalent up to single-qubit gates" when they have the same Cartan coordinates.

In the example embodiment, this parameter space 202 is a Weyl chamber in the Cartan coordinate space 202 defined by the equations:

$$0 \le t_x \le 1, \qquad (2)$$
$$0 \le t_y \le \min(t_x, 1-t_x),$$
$$0 \le t_z \le t_y,$$

which is bounded by the box defined by $0 \le t_x \le 1$ and $0 \le t_y$, $t_z \le 1/2$. Any 2-qubit unitary has a Cartan decomposition that lies in the Weyl chamber, and the example embodiments described herein provide optimization and interpolation methods for finding a control pulse for any arbitrary operations within the parameter space 202 (e.g., within the Weyl chamber). In the example embodiment, various reference points are associated with particular operations. For example, the reference points 212M and 212N represent an identity gate (I), the reference point 212P represents a controlled-not (CNOT) gate, the reference point 212L represents a swap gate (SWAP), and the reference point 212Q represents an iSwap gate (iSWAP).

Quantum systems, such as the quantum computing device 130 of FIG. 1, are manipulated by applying external control fields, which are specific to particular hardware and the desired operation. The evolution of a quantum system can be represented by its time-dependent Hamiltonian:

$$H(t) = H_0 + H_c(t), \qquad (3)$$

where $H_0$ denotes the system's intrinsic drift Hamiltonian and $H_c(t)=\Sigma_k f_k(t)H_k$ denotes the control Hamiltonian, which is typically described by constant control operators $H_k$ and variable control fields $f_k(t)$. Quantum optimal control aims to find the ideal $f_k(t)$ to realize a desired state transition or target unitary operation (e.g., quantum logic gate). This is formulated as the minimization of an objective function.

Control software can be formulated for many different objectives, such as pulses that are robust to varying hardware parameters or are easier to physically implement with a wave generator. In example embodiments, the Boulder Opal optimization package is used (a software tool made commercially available by Q-CTRL, of Sydney, Australia). Each control function $f_k(t)$ is discretized into n piecewise-constant segments with amplitudes denoted $\vec{\alpha}_k$, although the methods described herein work for any description of the control pulses. In the example embodiment, the following objective function is used:

$$J = 1 - \frac{1}{h^2}\left|Tr\{U_{target}^{\dagger} U_T\}\right|^2 + \frac{\lambda}{n_f}\sum_k^{n_f} \frac{\|\vec{\alpha}_k - \vec{\alpha}_{0,k}\|_2^2}{n_p \cdot \alpha_{max}^2}, \qquad (4)$$

where the first two terms of eq. (4) represent gate infidelity and the third term represents Tikhonov regularization. Gate infidelity is calculated between the target unitary $$U_{target}^{\dagger}$$

and the realized unitary $U_T$. Two-qubit gates have Hilbert space dimension h=4. The Tikhonov regularization term penalizes distance between the $n_f$ optimizable pulse parameters $\vec{\alpha}_k$ and fixed parameters $\vec{\alpha}_{0,k}$ (where index k indicates the kth parameter of the pulse vector) with chosen weight λ. The value $n_p$ is the number of optimizable parameters in each control. The regularization term encourages low-amplitude control pulses. In an example embodiment, $\lambda=10^{-2}$ is used, and do is chosen as discussed below.

In the example embodiment, the parameter space 202 is subdivided with a rectangular grid pattern. This subdivision adds additional interior vertices, such as reference points 212A, 212B, and 212C, which are treated as additional reference points 212. Each reference point 212 is identified in FIG. 2A as a black point, some of which are not expressly labeled. Some points are labeled in FIG. 2A to give additional reference between FIG. 2A and FIG. 2B. In this example, there are a total of 14 reference points 212. During operation, each of these reference points are the subject of the optimization methods described herein and are also used for interpolation of various arbitrary operations within the parameter space 202.

Figure 2B:
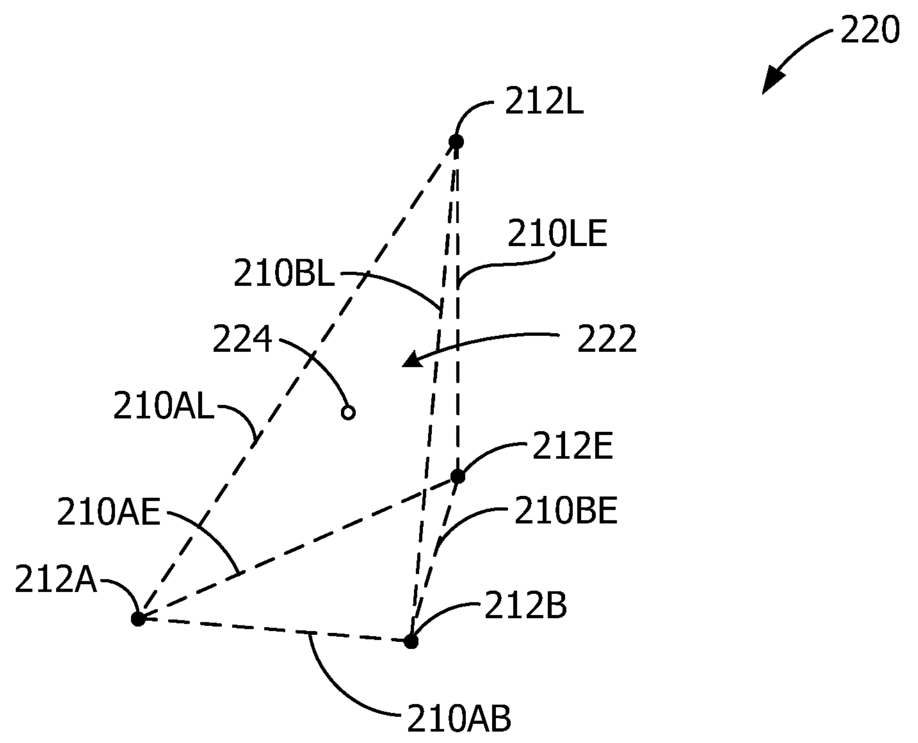
FIG. 2B is a diagram and graph that illustrates one portion of the large tetrahedron shown in FIG. 2A.
Figure 2B:
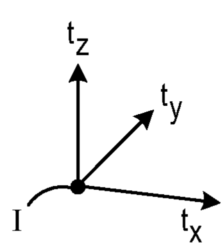

Also shown in FIG. 2A are various lines 210 connecting pairs of reference points 212. For example, line 210W connects from reference point 212M to reference point 212N, including individual line segments between three intervening reference points. While some lines 210 are illustrated in unbroken line and other lines 210 are illustrated in broken line, it should be understood that this use of differing lines does not necessarily suggest any difference between the lines 210, but rather is used to assist with visualization of depth FIG. 2B is a diagram and graph 220 that illustrates one portion of the large tetrahedron 200 shown in FIG. 2A. More specifically, the graph 220 identifies a sub-region 222 of the overall parameter space 202 that is bounded by reference points 212A, 212B. 212L, and 212E. Each pair of reference points 212 shown in FIG. 2 is connected by a line 210, namely line 210AB connecting reference points 212A and 212B, line 210AL connecting reference points 212A and 212L, line 210LE connecting reference points 212L and 212E, and line 210BE connecting reference points 212B and 212E. Lines 210 may also be referred to herein as "edges" 210, as they connect two reference points 212.

Also illustrated in FIG. 2B is an example interpolation point 224 that falls within the sub-region 222. This example interpolation point 224 represents an arbitrary operation somewhere within the sub-region 222 for which an optimized pulse is sought (e.g., to prepare the quantum circuit 112 for execution).

Referring now to FIG. 2A and FIG. 2B, the various reference points 212 are the subject of optimization performed by the systems and methods described herein. These reference points 212 are refined through one or more iterations of an optimization process described below. The graph 200 may be represented in graph notation (e.g., nodes and edges) or any such representation that allows the practice of the systems and methods described herein. Once optimization of the reference points 212 are finalized, one or more of these reference points 212 are used to determine, via interpolation, an optimized control pulse for arbitrary operations within the parameter space 202, such as the interpolation point 224. More specifically, in the example embodiment, the entirety of the parameter space 202 is subdivided into individual tetrahedrons (e.g., a 3-D mesh of tetrahedrons), each of which defines a sub-region such as the sub-region 222 shown in FIG. 2B (e.g., as identified by four corner reference points 212 and six associated edges 210). During preparation of the quantum circuit 112 for execution, when a particular arbitrary operation 224 is encountered, a sub-region 222 in which that operation 224 occurs is identified, along with the associated four reference points 212 of that sub-region 222. These four reference points 212 are then used in an interpolation process to generate a reference pulse for the particular operation 224. These various optimization and interpolation techniques are described in greater detail below.

While FIG. 2A illustrates an example reference point granularity (e.g., ¼ in this example, yielding 14 reference points in the parameter space 202), it should be understood that other reference point granularities may be practiced in the scope of this disclosure. For example, a reference granularity of ½ (e.g., five points), ⅙ (e.g., 30 points), or 1/12 (e.g., 140 points) may be used, each of which impacts the number of reference points 212 within the graph 220 that is optimized (e.g., where less reference points 212 cases the computational burden during optimization, but increases the average distance from arbitrary operations to nearby reference points 212, and where more reference points 212 has the reverse effect). Further, while the example embodiments use tetrahedrons for the sub-regions 222 (e.g., and four associated reference points 212), it should be understood that other volumetric shapes may be used, and that more or less than three parameters (e.g., three dimensions) may be used. For example, it may be determined that some regions of parameter space require higher density of reference points than others, in which case a non-uniform reference point distribution could be used to improve overall effectiveness of the systems and methods described herein.

Figure 3:
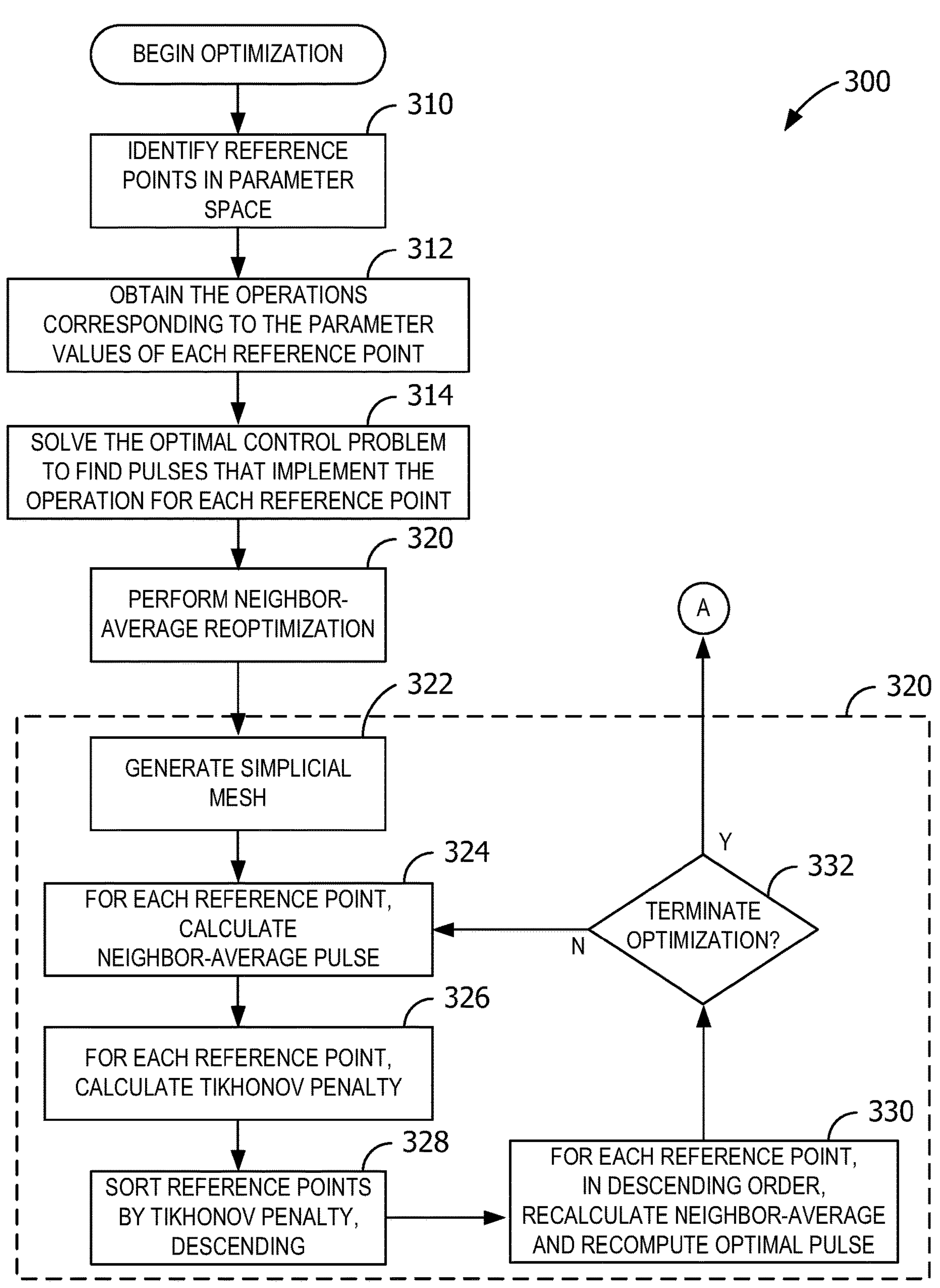

FIG. 3 is a flow chart illustrating an example method 300 for optimizing reference pulses and interpolating arbitrary operations within a parameter space for operations of the quantum circuit 112 shown in FIG. 1 using the graph 200 of a parameter space 202 shown in FIG. 2A. In some embodiments, the method 300 is performed by the optimization engine 114 (shown in FIG. 1) (e.g., performed on a classical computing device, such as the control computing device 110). In the example embodiment, at step 310, the optimization engine 114 identifies a set of reference points, $p_k$, in the parameter space 202 (e.g., reference points 212). In some embodiments, the granularity of the grid spacing or placement of the point distribution of reference points 212 may be a tunable parameter or may otherwise be preconfigured (e.g., in a specific pattern, as shown in FIG. 2A, or in some non-uniform distribution).

At steps 312 and 314, the optimization engine 114 performs an initial optimization of the reference points 212. More specifically, at step 312, in the example embodiment, the optimization engine 114 determines the operations corresponding to the parameter values ($t_x$, $t_y$, $t_z$) of each reference point 212 using Eq. (1). At step 314, for each of these operations, the optimization engine 114 computes pulse parameters $\vec{\alpha}$ such that the resulting operation U_T and the parameters & approximately minimize the cost function Eq. (4). For this initial optimization, in the example embodiment, Tikhonov fixed parameters of $\vec{\alpha}_0=\vec{0}$ are used in eq. (4) (e.g., to encourage low-amplitude pulses).

After operation 314, in some embodiments, the interpolation operations described herein may be performed. However, some areas within the parameter space 202 may exhibit unfavorable interpolation results, as this initial pulse set may not always interpolate well in all parts of the parameter space 202. There is no guarantee that control pulses for similar unitaries will themselves be similar. There can be many distinct control sequences that can realize the exact same unitary operation. This issue is partly resolved by the above-mentioned Tikhonov regularization of $\vec{\alpha}_0=\vec{0}$, because favoring low-amplitude controls reduces the space of acceptable pulse parameter solutions, but additional improvements can be achieved (e.g., by reoptimizing the reference points 212 so they are more similar to each other). The poor interpolation fidelities obtained from naïve initial optimizations motivate a more intelligent approach to finding reference pulses.

More specifically, and in the example embodiment, the optimization engine 114 performs a reoptimization process at step 320 (referred to herein as "neighbor-average reoptimization"). This neighbor-average reoptimization step 320 includes generating simplicial meshes at step 322. A d-simplex is a polygon formed by d+1 points in d dimensions. For example, a 2-simplex is a triangle and a 3-simplex is a tetrahedron. For a set of k≥d+1 points in d dimensions, a mesh of contiguous d-simplices can be generated to cover the space between the points. Each point will be the vertex of one or more simplices in the mesh. An example 3-simplex (e.g., in three dimensions) is the subregion 222 of graph 220 shown in FIG. 2B. In the example embodiment, the step 322 includes generating a simplicial mesh across the reference points (e.g., using scipy.spatial.Delaunay function). This step 322 can be performed with any configuration of reference points 212. From this mesh, the neighbors of a given reference point 212 can be queried (e.g., all other points that are connected by an edge to a given reference point 212 of interest).

At step 324, in the example embodiment, the optimization engine 314 begins an iterative optimization loop by calculating a neighbor-average pulse for each reference point. For each reference point, its neighboring vertices $\eta(p_i)$ are identified and used to calculate the neighbor-average pulse:

$$\hat{\vec{\alpha}}_i = \frac{1}{d}\sum_{p_j\in\eta(p_i)} \vec{\alpha}_j, \tag{5}$$

which is the average over the pulses of all neighboring points, $p_i$. At step 326, a Tikhonov penalty for each reference point 212 is then calculated (e.g., as shown in eq. (4)) between the optimized pulse $\vec{\alpha}_i$ and the neighbor-average $\hat{\vec{\alpha}}_i$. More specifically, the variable $\vec{\alpha}_0$ in Eq. (4) is replaced with the neighbor-average pulse vector $\hat{\vec{\alpha}}_i$, and the Tikhonov penalty is equal to the value of this term of the equation.

At step 328, all of the reference points 212 are sorted based on their current Tikhonov penalty (e.g., as calculated in step 326), and in descending order (e.g., highest to lowest). Then, at step 330, for each reference point 212 in the sorted list, starting with the highest, the optimization engine 114 recalculates each neighbor-average pulse, $\hat{\vec{\alpha}}_i$ (e.g., using eq. (5)), and then re-optimizes $\vec{\alpha}_i$ by setting $\vec{\alpha}_0$ in Eq. (4) to $\vec{\alpha}_i$ and computing the new optimal control pulse parameters that minimize the cost function Eq. 4.

At test 332, the optimization engine 114 determines whether to terminate optimization. If optimization continues, the optimization engine 114 returns to step 324 and performs another round of increased optimization. In some embodiments, the optimization may be performed only a preconfigured number of times (e.g., once, twice, three times, or the like). In other embodiments, optimization can be repeated until some threshold is met for the maximum (worst) Tikhonov penalty between a reference pulse and its neighbor-average pulse, or until this same value converges (its change between subsequent re-optimization rounds is sufficiently small), or until some time limit has been reached. Exact termination criteria will depend on specific use-case, desired pulse quality, and computation time allowance.

Upon conclusion of the optimization process shown in FIG. 3A, the optimization engine 114 has constructed an optimization graph 200 that includes a number of the reference points 212 in the parameter space 202, edges or lines 210 from each reference point 212 to linked neighbors, and may individually identify each d-simplex between in the d-dimensional parameter space 202. Further, the optimization engine 114 has computed $n_f$ optimized pulse parameters $\vec{\alpha}_k$ for each reference point 212, which will be used during interpolation of arbitrary operations as discussed in FIG. 3B below.

The Tikhonov regularization term encourages each result pulse to be similar to the average of the neighbors of the point in parameter space 202. This tune-up procedure loop of steps 324-330 can be repeated multiple times, with each round of re-optimization building upon the last and steering the optimized pulses to be increasingly similar to each other. This procedure can lead to significantly improved average and worst-case interpolation fidelities. Further, it should be noted that this methodology is independent of the choice of optimization procedure.

Once optimization is complete, the optimization graph 200 and associated details may be used to generate optimized pulses for arbitrary operations within the parameter space.

Figure 4:
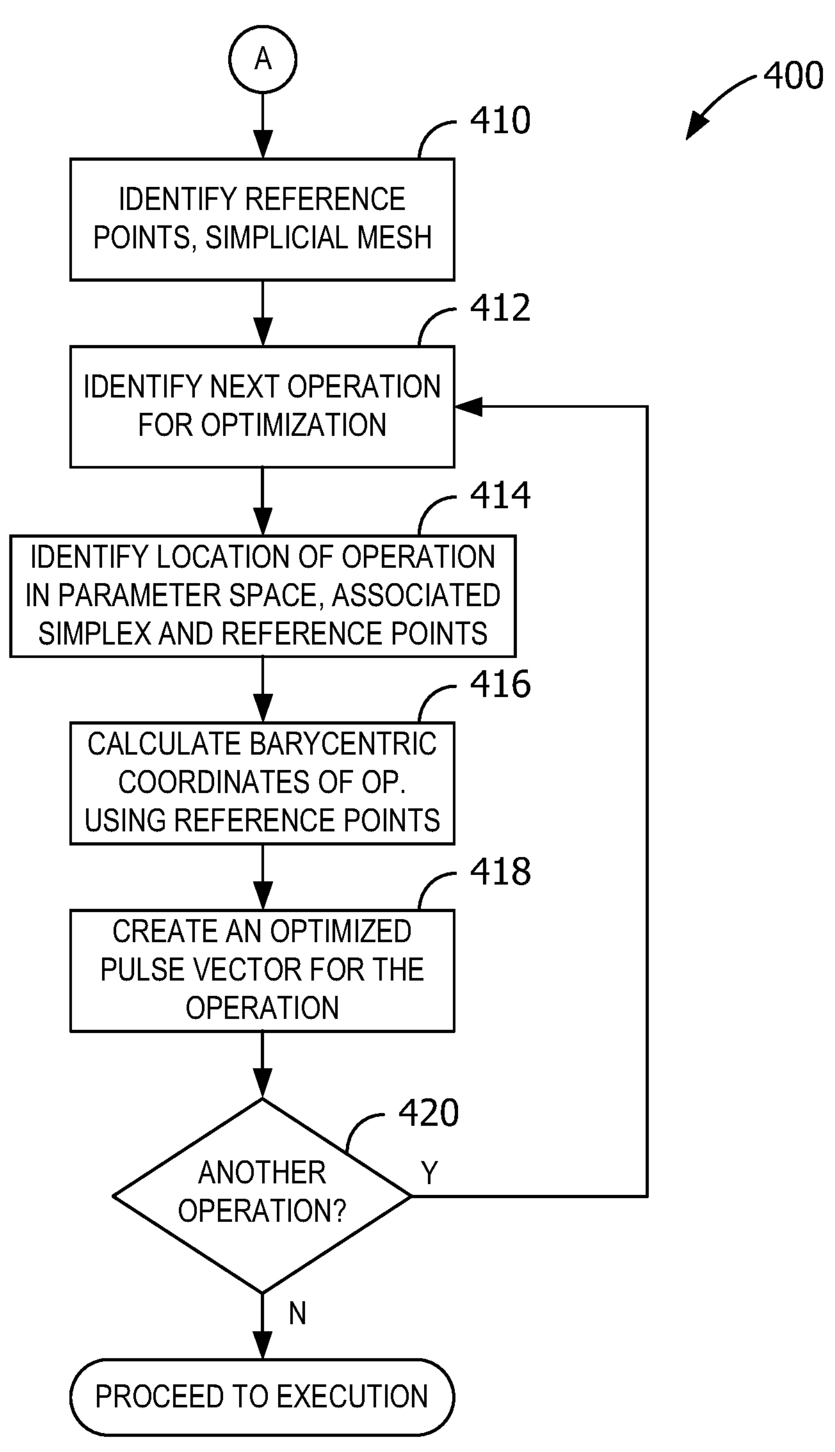

FIG. 4 is a flow chart 400 illustrating an example method 400 for optimizing arbitrary operations 224 within the parameter space 202 using the graph 200 shown in FIG. 2A. In some embodiments, the method 400 is performed by the optimization engine 114 after generating the graph 200 as described above. The following description provides examples in the three-dimensional parameter space 202 of FIG. 2A and FIG. 2B, but it should be understood that these methods 300, 400 can be extended into greater or lesser dimensions and other parameter spaces. The example method 400 performs interpolation between a subset of optimized reference pulses to generate an optimized reference pulse for an arbitrary operation using linear combinations of reference pulses weighted by barycentric coordinates. For example, and for purposes of discussion, this arbitrary operation may be the arbitrary operation 224 shown in FIG. 2B, and as such, the associated optimized reference points may be reference points 212A, 212B, 212D, 212E and the identified simplex may be the subregion 222.

Consider the case of a single-parameter gate family $R_X(\theta)$, which performs a rotation about the X axis of the Bloch sphere by an angle θ. Given an $R_X(\pi)$ pulse, an arbitrary $R_X(\theta)$ pulse can be obtained by downscaling the amplitude by θ/π. This can be interpreted as a linear interpolation:

$$R_X(\theta) = \left(1 - \frac{\theta}{\pi}\right) \cdot R_X(0) + \frac{\theta}{\pi} \cdot R_X(\pi), \tag{6}$$

between $R_X(\theta)$ (a zero-amplitude pulse) and the calibrated $R_X(\pi)$ pulse.

The Cartan decomposition of a two-qubit gate (e.g., of eq. (1)) has similar properties to single-qubit rotation gates, such as the fact that sequential Cartan operations can be merged by adding each coordinate. As such, the method 400 introduces barycentric interpolation on simplices as a generalization of the single-parameter linear interpolation into multidimensional parameter space (e.g., parameter space 202).

Consider a set of d+1 reference points $\{p_i\}$ in a d-dimensional space and a single new point $\tilde{p}$ that lies in between these reference points. An interpolated pulse vector $\vec{\alpha}_{\tilde{p}}$ can be calculated as a linear combination of the reference pulses $\vec{\alpha}_i$ of the reference points $\{p_i\}$, with weights dependent on how close the point $\tilde{p}$ is to each reference point $p_i$ in the parameter space. The d+1 reference points are the vertices of a d-dimensional simplex (e.g., reference points 212A, 212B, 212D, 212E of subregion 222).

Barycentric coordinates provide the weights for generalized linear interpolation. There are d+1 barycentric coordinates of a point within a d-dimensional simplex, each corresponding to a specific vertex and, in the example embodiment, are each bounded by [0,1] and together sum to 1. Barycentric coordinates $b_i$ are uniquely determined by a requirement that the target point is equal to the coordinate-weighted sum of the vertices:

$$\tilde{p} = \sum_{i \in v(S_{\tilde{p}})} b_i p_i, \tag{7}$$

where $b_i$ is the barycentric coordinate of $\tilde{p}$ with respect to vertex $p_i$. Thus, the closer the point is to a given vertex, the larger the corresponding coordinate will be. As such, a linearly-interpolated pulse vector is determined by:

$$\vec{\alpha}_{\tilde{p}} = \sum_{i \in S_{\tilde{p}}} b_i \vec{\alpha}_i, \tag{8}$$

where $v(S_{\tilde{p}})$ denotes the set of vertices (e.g., reference points 212A, 212B, 212D, 212E) that define the simplex $S_{\tilde{p}}$ (e.g., subregion 222) that contains the point $\tilde{p}$ (e.g., arbitrary operation 224), and where $b_i$ is the barycentric coordinate of $\tilde{p}$ with respect to vertex i, and where $\vec{\alpha}_i$ is the optimized reference pulse at vertex i (e.g., as generated during optimization method 200 of FIG. 2).

Accordingly, using the above barycentric interpolation technique, and turning to the example embodiment, the optimization engine 114 identifies the reference points 212 and simplicial mesh at step 410 (e.g., the graph 200 and all of the various associated subregions 222). At step 412, the optimization engine 114 identifies a next operation for optimization, such as the operation 224. At step 414, the optimization engine 114 identifies the location of the current operation 224 (e.g., the point $\tilde{p}$) within the parameter space, and specifically identifies which simplex or subregion 222 the current operation 224 appears, as well as the vertices of at identified simplex (e.g., the reference points 212A, 212B, 212D, 212E).

At step 416, in the example embodiment, the optimization engine 114 calculates the barycentric coordinates $b_i$ of the point $\tilde{p}$ using the vertices of the identified simplex and eq. (7). At step 418, the optimization engine then uses the barycentric coordinates as weights to the optimized pulses of each of the vertices to create an optimized pulse vector for the operation using eq. (8). As such, an optimized pulse vector $\vec{\alpha}_{\tilde{p}}$ is generated for the arbitrary operation 224 based on this barycentric interpolation between a set of nearby optimized pulses, which were optimized to target improved interpolation as discussed above. This optimized pulse vector may then be used for this operation 224 during execution of the quantum circuit 112. If, at test 420, another operation optimization is needed, the method 400 returns to perform another optimization in steps 412-418. Otherwise, the optimization engine 114 can continue preparing the quantum circuit 112 for execution and proceed to execution.

In some embodiments, these interpolation techniques can be extended to an arbitrary family of quantum operations (e.g., other gate families). This generalized process may include, for example, determining the target device for the operation. If using a model-based optimizer, this can include obtaining a model (such as a Hamiltonian) of the device. Parameters of the gate family may be defined and a parameter space can be determined, thereby setting parameter bounds to be interpolated within. A number of parameter points $\{p_i\}$ may be identified from this space according to some predetermined distribution, and the corresponding quantum operations for each may be determined. An initial optimization may be performed by identifying a pulse description $\vec{\alpha}$ (e.g., a finite set of variables used to construct each pulse) and a pulse optimization algorithm.

The optimizer is used to generate initial reference pulses $\vec{\alpha}_i$ for each reference point, and this optimizer can incorporate robustness constraints or machine feedback data. The optimizer then performs reoptimization for each reference point, calculating some new target pulse $\vec{\alpha}_{0,i}$ based on the set of existing reference pulses, and reoptimizing the reference pulse with this target pulse as the initial guess. Use of Tikhonov regularization in the cost function encourages the final pulse to be close to the target pulse. This reoptimization step can be repeated multiple times to improve interpolation quality. An interpolation function $f$: $(\tilde{p}, \{p_i, \tilde{\alpha}_i\}) \rightarrow \vec{\alpha}_{\tilde{p}}$ as can then be chosen and used to calculate interpolated pulse $\vec{\alpha}_{\tilde{p}}$ at parameter-space point p given the set of optimized reference points and pulses $\{p_i, \vec{\alpha}_i\}$.

In some embodiments, the technique can be extended to multi-parameterized Hamiltonians. In this case, the same quantum operation could be optimized for different Hamiltonian values, such as different qubit frequencies or different control drive strengths, and similar methods could be used to obtain control pulses for any Hamiltonian values. This could be integrated with the previously-described methods to allow for interpolated control pulses for different Hamiltonians and different operations simultaneously.

In some embodiments, the optimization engine 114 may incorporate real measurements from the target quantum device (e.g., a particular quantum computing device 130) to improve the pulse optimization loop (e.g., account for inaccuracies in device models). For example, the optimization engine 114 may perform many trials of a candidate pulse on the quantum device 130 and then aggregate the resulting measurement data to approximate the final state of the system. This procedure can replace or augment standard offline simulations of pulse dynamics, which may use a potentially-inaccurate device model, to give the optimization engine 114 more information about the actual behavior of the quantum device 130 under the candidate pulse. This procedure can lead to improved fidelity compared to only using the offline model.

To incorporate such closed-loop methods into the described interpolation framework, a closed-loop optimizer such as d-GRAPE or a model predictive control optimizer can directly replace the standard optimizer. These optimizers can incorporate a cost function term similar to the Tikhonov regularization in eq. (4). As such, the reoptimization and interpolation procedures can be executed as described, with the only change being the optimizer itself. Because a closed-loop optimizer can achieve higher experimental fidelities than a naïve model-based optimization, it is expected that interpolation quality will be additionally improved under use of a closed-loop optimizer.

In the example embodiments, it is assumed that all pulses have the same fixed duration (e.g., regardless of the target quantum operation). In reality, it is much easier to do a gate that is close to the identity than a more complex operation such as SWAP. As such, easier gates could be accomplished with a shorter duration within the same pulse amplitude bounds, compared to the more complex gates in the family. As such, in some embodiments, depending on the chosen pulse description, it can be possible to include the duration of the pulse directly as an optimizable quantity. For example, it is relatively simple to change the duration of a pulse that is described in a Fourier basis. The duration is then an additional element in the pulse vector and can be included in the interpolation. Alternatively, when constrained to a specific duration as in these example embodiments, some easier operations need not make use of the full allowed amplitude of the pulse. In this case, for some Hamiltonians, it is possible to upscale the amplitude and downscale the duration equivalently to obtain a shorter pulse with the same effect. A new cost function term could be added to the optimizations to penalize the maximum value of the control field to improve the amount of downscaling possible.

In the example embodiments described herein, a neighbor-average Tikhonov regularization method and simple piecewise-linear interpolation is used. However, the idea of creating reference pulses and interpolating between them could have many possible implementations. For example, in some embodiments, a nonuniform reference point distribution may be used. Reference points need not be distributed on a rectangular grid. The Delaunay triangulation method will work just as well with a nonuniform distribution of points. As such, some areas may benefit from more densely-packed reference points in certain parts of parameter space than others (e.g., to give better interpolations). Further, the neighbor-average method was used to generate the initial guesses for the Tikhonov regularization reoptimization. However, this general approach could also be applied using guesses generated in some other way. For example, each new reference point guess could be a weighted sum of all previous reference pulses, with weights determined by some notion of distance between the unitary at the new point and each of the previous unitaries. Additionally, regardless of optimization method, different methods can be used for the interpolation step of the methods described herein. For example, piecewise interpolation could be done using a higher-order model such as a spline. A higher-order polynomial (or other function) could also be fitted to the entire space of points to avoid the piecewise assumption. The best polynomial interpolation function could be determined by post-optimization analysis of the pulse vectors d. Further, instead of running individual optimizations at each reference point, all points could be optimized at once in one large meta-optimization. Consider a cost function consisting of the standard infidelity term, averaged over all reference points, as well as a new term that is proportional to the total curvature (or some other metric) of an interpolation function fitted to the reference point pulses. The optimization would thus calculate the pulse shapes and the interpolating function together.

As will be appreciated based on the foregoing specification, the above-described embodiments of the disclosure may be implemented using computer programming or engineering techniques including computer software, firmware, hardware or any combination or subset thereof, wherein the technical effect is to compile and optimize a quantum program for a quantum processor. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These conventional computer programs (also known as programs, software, software applications, "apps", or code) include machine instructions for a conventional programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A quantum computing system for compiling and executing instructions on a quantum processor, the system comprising:

the quantum processor including a plurality of qubits;

a classical memory including a quantum circuit, the quantum circuit defines a plurality of instructions for execution; and a classical processor communicatively coupled to the classical memory, the memory including computer-executable instructions that, when executed by the classical processor, cause the classical processor to:

identify a plurality of reference points in a parameter space of a family of gates that are executable by the quantum processor;

identify a plurality of edges in the parameter space, each edge connecting two reference points of the plurality of reference points and defining a neighbor relationship between the two connected reference points;

generate an initial pulse vector for each reference point of the plurality of reference points;

optimize the initial pulse vector for each reference point of the plurality of reference points based on the initial pulse vector of each neighboring reference point connected to that reference point by an edge;

identify a target operation within the quantum circuit for optimization;

generate a pulse vector for the target operation based on interpolating between a subset of reference points of the plurality of reference points by varying an intensity of microwave electrical signals to manipulate a speed of rotation of qubits; and cause the target operation to be executed on the quantum processor using the pulse vector for the target operation.

2. The quantum computing system of claim 1, wherein optimizing the initial pulse vectors for each reference point of the plurality of reference points further includes:

calculating a neighbor-average pulse vector for each reference point by averaging pulse vectors associated with each connected reference point;

calculating a penalty term for each reference point;

sorting the plurality of reference points based on the penalty term of each reference point; and recalculating the neighbor-average pulse vector for each reference point, in descending order.

3. The quantum computing system of claim 2, wherein calculating the penalty term for each reference point includes calculating a Tikhonov penalty using Tikhonov regularization.

4. The quantum computing system of claim 2, wherein generating a pulse vector for the target operation further includes performing a second optimization of each reference point of the plurality of reference points, the second optimization including recalculating a new neighbor-average pulse vector for each reference point using a prior set of pulse vectors for each reference point of the plurality of reference points.

5. The quantum computing system of claim 1, wherein the instructions further cause the classical processor to:

generate a simplicial mesh comprising a plurality of polygons, each polygon of the plurality of polygons is a d-simplex polygon formed by d+1 reference points of the plurality of reference points, each polygon defining a subregion of the parameter space, wherein generating a pulse vector for the target operation further includes:

identifying a first polygon from the plurality of polygons, the first polygon being identified as containing the target operation within the associated subregion of the parameter space; and identifying the subset of reference points based on vertices of the first polygon.

6. The quantum computing system of claim 1, wherein generating a pulse vector for the target operation further includes:

calculating a barycentric coordinate of the target operation relative to each of the reference points of the subset of reference points; and generating the pulse vector by summing the pulse vectors of each of the reference points of the subset of reference points, using the barycentric coordinate of each reference point as a weight to the associated pulse vector of that reference point in the summing.

7. The quantum computing system of claim 1, wherein the parameter space is a Weyl chamber having three dimensions.

8. A computer-implemented method for optimizing instructions of a quantum circuit for execution on a quantum processor, the method is performed by a classical computing device, the method comprising:

selecting a plurality of reference points in a parameter space of a family of gates that are executable by the quantum processor;

identifying a plurality of edges in the parameter space, each edge connecting two reference points of the plurality of reference points and defining a neighbor relationship between the two connected reference points;

computing a first pulse vector for each reference point of the plurality of reference points;

optimizing the first pulse vector for each reference point of the plurality of reference points based on the first pulse vector of each neighboring reference point connected to that reference point by an edge;

receiving a target operation from the quantum circuit for optimization;

generating a second pulse vector for the target operation based on interpolating between a subset of reference points of the plurality of reference points by varying an intensity of microwave electrical signals to manipulate a speed of rotation of qubits; and causing the target operation to be executed on the quantum processor using the second pulse vector for the target operation.

9. The method of claim 8, wherein optimizing the first pulse vectors for each reference point of the plurality of reference points further includes:

calculating a neighbor-average pulse vector for each reference point by averaging pulse vectors associated with each connected reference point;

calculating a penalty term for each reference point;

sorting the plurality of reference points based on the penalty term of each reference point; and recalculating the neighbor-average pulse vector for each reference point, in descending order.

10. The method of claim 9, wherein calculating the penalty term for each reference point includes calculating a Tikhonov penalty using Tikhonov regularization.

11. The method of claim 9, wherein generating the second pulse vector for the target operation further includes performing a second optimization of each reference point of the plurality of reference points, the second optimization including recalculating a new neighbor-average pulse vector for each reference point using a prior set of pulse vectors for each reference point of the plurality of reference points.

12. The method of claim 8, further comprising:

creating a graph comprising a plurality of polygons, each polygon of the plurality of polygons is a d-simplex polygon formed by d+1 reference points of the plurality of reference points, each polygon defining a subregion of the parameter space, wherein generating the second pulse vector for the target operation further includes:

identifying a first polygon from the plurality of polygons, the first polygon being identified as containing the target operation within the associated subregion of the parameter space; and identifying the subset of reference points based on vertices of the first polygon.

13. The method of claim 8, wherein generating the second pulse vector for the target operation further includes:

calculating a barycentric coordinate of the target operation relative to each of the reference points of the subset of reference points; and generating the second pulse vector by summing the first pulse vectors of each of the reference points of the subset of reference points, using the barycentric coordinate of each reference point as a weight to the associated pulse vector of that reference point in the summing.

14. The method of claim 8, wherein the parameter space is a Weyl chamber having three dimensions.

15. A non-transitory computer-readable storage media having computer-executable instructions embodied thereon, wherein when executed by at least one classical processor, the computer-executable instructions cause the classical processor to:

select a plurality of reference points in a parameter space of a family of gates that are executable by a quantum processor for executing a quantum circuit;

identify a plurality of edges in the parameter space, each edge connecting two reference points of the plurality of reference points and defining a neighbor relationship between the two connected reference points;

compute a first pulse vector for each reference point of the plurality of reference points;

optimize the first pulse vector for each reference point of the plurality of reference points based on the first pulse vector of each neighboring reference point connected to that reference point by an edge;

identify a target operation from the quantum circuit for optimization;

generate a second pulse vector for the target operation based on interpolating between a subset of reference points of the plurality of reference points by varying an intensity of microwave electrical signals to manipulate a speed of rotation of qubits; and cause the target operation to be executed by the quantum processor, using the second pulse vector for the target operation.

16. The non-transitory computer-readable medium of claim 15, wherein optimizing the first pulse vectors for each reference point of the plurality of reference points further includes:

calculating a neighbor-average pulse vector for each reference point by averaging pulse vectors associated with each connected reference point;

calculating a penalty term for each reference point;

sorting the plurality of reference points based on the penalty term of each reference point; and recalculating the neighbor-average pulse vector for each reference point, in descending order.

17. The non-transitory computer-readable medium of claim 16, wherein calculating the penalty term for each reference point includes calculating a Tikhonov penalty using Tikhonov regularization.

18. The non-transitory computer-readable medium of claim 16, wherein generating the second pulse vector for the target operation further includes performing a second optimization of each reference point of the plurality of reference points, the second optimization including recalculating a new neighbor-average pulse vector for each reference point using a prior set of pulse vectors for each reference point of the plurality of reference points.

19. The non-transitory computer-readable medium of claim 15, wherein the instructions further cause the classical processor to:

create a graph comprising a plurality of polygons, each polygon of the plurality of polygons is a d-simplex polygon formed by d+1 reference points of the plurality of reference points, each polygon defining a subregion of the parameter space, wherein generating the second pulse vector for the target operation further includes:

identifying a first polygon from the plurality of polygons, the first polygon being identified as containing the target operation within the associated subregion of the parameter space; and identifying the subset of reference points based on vertices of the first polygon.

20. The non-transitory computer-readable medium of claim 15, wherein generating the second pulse vector for the target operation further includes:

calculating a barycentric coordinate of the target operation relative to each of the reference points of the subset of reference points; and generating the second pulse vector by summing the first pulse vectors of each of the reference points of the subset of reference points, using the barycentric coordinate of each reference point as a weight to the associated pulse vector of that reference point in the summing.

* * * * *